UNITED STATES PATENT OFFICE 2,680,713

PROCESS FOR PREPARING DIESTERS OF UNSATURATED ALPHA, OMEGA-DICARBOXYLIC ACIDS BY ELECTROLYSIS

Richard V. Lindsey, Jr., and Marvin L. Peterson, Wilmington, Del., assignors to E. I. du Pont de Nemours & Company, Wilmington, Del., a corporation of Delaware No Drawing. Application March 16, 1953,
Serial No. 342,706

13 Claims. (Cl. 204—59)

This invention relates to esters of dicarboxylic acids. More particularly, this invention relates to a new method for the preparation of long-chain alpha,omega-dicarboxylic acid esters and especially to the preparation of long-chain unsaturated alpha,omega-dicarboxylic acid esters.

Dicarboxylic acids and their esters are useful for many purposes such as in the preparation of condensation polymers and plasticizers, and as intermediates in various chemical reactions. Such dicarboxylic acids and esters can be prepared by a variety of methods, but improved methods for the preparation of symmetrical long-chain alpha,omega-dicarboxylic acids and esters, especially symmetrical long-chain unsaturated alpha,omega-dicarboxylic acids and esters are desirable.

A method for making esters of dicarboxylic acids which has been known for some time is the Brown-Walker electrosynthesis. This process is a modification of the Kolbe electrosynthesis of hydrocarbons. In the Brown-Walker reaction, alkali metal salts of monoesters of dicarboxylic acids are subjected to electrolytic oxidation and the resulting products are esters of dibasic acids with double the number of $CH_2$ groups that were present in the original acids. While this latter process does give longer chain dicarboxylic acid esters, the chain length of the products is limited by the number of carbon atoms between the carboxyl groups of the dicarboxylic acid portion of the monoester.

It is an object of this invention to provide a novel process for the preparation of long-chain alpha,omega-dicarboxylic acid esters. A further object is to provide a new process for the preparation of long-chain unsaturated alpha,omega-dicarboxylic acid esters. A still further object is to provide a process for the preparation of long-chain alpha,omega-dicarboxylic acid esters which is independent as to chain length of the starting acid esters. Another object is to provide a process for the preparation of esters of long-chain alpha,omega-dicarboxylic acids having two nonconjugated ethylenic double bonds. Other objects will appear hereinafter.

These and other objects are accomplished by the following invention of a process for preparing esters of long-chain unsaturated alpha, omega-dicarboxylic acids which comprises subjecting a monoester salt of a dicarboxylic acid in an inert organic solvent to electrolytic oxidation in the presence of a conjugated diene. It has now been found that esters of long-chain unsaturated alpha,omega-dicarboxylic acids having two nonconjugated ethylenic double bonds can be prepared directly by the electrolytic oxidation of a monoester salt of a dicarboxylic acid in the presence of a conjugated diene.

The process of this invention is carried out under the general operating conditions of the well-known Kolbe electrolytic oxidation process. More particularly, the operating conditions used in the Brown-Walker modification of the Kolbe reaction as described by Hickling and Westwood in J. Chem. Soc. 1039 (1938) and 1109 (1939) are generally used.

However, instead of the dicarboxylic acid residues combining directly as in the Brown-Walker synthesis, the conjugated diene participates in the reaction with the result that compounds formed contain an unsaturated hydrocarbon group between the dicarboxylic acid residues.

The process of this invention is illustrated by the following equations showing a possible mechanism of the electrolytic oxidation of methyl malonate ion in the presence of butadiene:

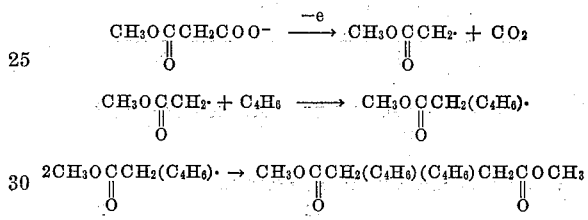

The group ($C_4H_6$) in the above equations includes the two possible radicals derived from butadiene by 1,2- and by 1,4-addition to the conjugated double bonds. Thus, the reaction illustrated by the above equations leads to three isomers:

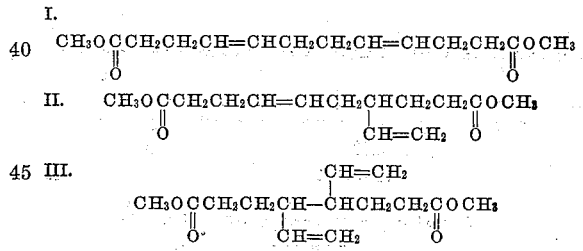

In the reaction illustrated above, 1,4-addition to the butadiene predominates with the result that isomer I is the principal dicarboxylic acid ester obtained in the reaction product.

A preferred manner of carrying out the process of this invention, which involves the reaction of a mixture of a monoester salt of a dicarboxylic acid with a conjugated diene, comprises placing a solution of a monoester of a dicarboxylic acid, e. g., monomethyl adipate, a salt of the monoester of the dicarboxylic acid, e. g., potassium methyl adipate, and a conjugated diene, e. g., 1,3-butadiene, in an inert organic liquid which is a solvent for the reactants, e. g., methanol or aqueous methanol, in an electrolytic cell fitted with platinum electrodes. Electric current at a potential of approximately 2 volts or more is passed through the reaction mixture. The current density is not critical, but should be high enough to produce a practical rate of electrolysis. Current densities of from 0.01 to 0.5 ampere per square centimeter of anode surface give good results; however, higher or lower current densities can be used, if desired. The current is passed between the electrodes until sufficient current has passed through the solution to substantially completely electrolyze the monoester of the dibasic acid. The reaction is complete when the pH of the reaction mixture, which is acidic at the start of the reaction, becomes basic.

The electrolysis can be carried out over a wide range of temperatures, for example, from $-20°$ to $100°$ C., and preferably temperatures of from $-15°$ to $25°$ C. are used. The particular temperature selected is dependent on the volatility of the particular conjugated diene employed, a reaction temperature being employed that is low enough to prevent substantial loss of reactants by volatilization. Thus, with butadiene as the conjugated diene, suitable operating temperatures range between $-20°$ and $-5°$ C. With less volatile diene reactants, higher operating temperatures are useful.

The resultant diester of a dicarboxylic acid having two ethylenic double bonds is isolated from the reaction mixture by conventional means. A very suitable method of working up the reaction product consists in, first, neutralizing the reaction mixture with a mineral acid, e. g., sulfuric acid, and then removing excess solvent by evaporation. The residue is then mixed with water and the oily layer which separates is taken up in an organic solvent such as diethyl ether. The aqueous phase can be extracted several times with the organic solvent and the combined extracts dried and fractionally distilled through an efficient fractionating column.

The relative proportions of the acid-ester and ester-salt and their total concentration in the solution, as well as the proportions of conjugated diene, can be varied widely in the process of this invention and are not critical. Concentrations of the dicarboxylate (total of the acid-ester and ester-salt) in the solvent ranging from 0.5 to 2.0 M give satisfactory results in the process of this invention. The ratio of these two dicarboxylate ingredients can range from 100% ester-salt to about 7 moles of acid-ester to 1 mole of ester-salt. Generally it is preferred to use an excess of the acid-ester with only enough ester-salt to impart to the resulting solution sufficient conductivity to enable an adequate electric current to be passed through the solution during the electrolysis. A ratio of 3 moles of acid-ester to 1 mole of ester-salt is particularly well suited for use in the process of this invention.

The products obtained by the process of this invention result from the addition of one mole of conjugated diene to each mole of the dicarboxylic acid-ester reactant. Consequently, at least equivalent amounts of diene and dicarboxylic acid reactants should be employed. However, better yields of the unsaturated dicarboxylic acid ester are obtained when an excess of diene is used. Good results are obtained when the amount of diene ranges from 2 to 10 moles of diene per mole of dicarboxylate reactant.

The following examples further illustrate the process of this invention.

Example I

An electrolytic cell fitted with a platinum gauze disc 3.7 centimeters in diameter as the anode and a platinum cathode, a condenser cooled by a mixture of acetone and solid carbon dioxide, and an external means for maintaining the electrolyte solution at the desired temperature, is charged with the following electrolyte solution: potassium ethyl malonate 30 g., methanol 300 ml., butadiene 80 g. The solution is electrolyzed at an average current of 1.1 amperes until 0.28 equivalent of electricity has been passed through the cell. The temperature of the solution is maintained at about $-5°$ C. during the electrolysis.

The resulting solution is neutralized with sulfuric acid and then evaporated to a volume of 75 ml. When 300 ml. of water is added to this solution, an oil separates which is taken up in diethyl ether (about 50 ml.). The aqueous solution is extracted several times with ether. The ether solution and extracts are combined, dried and then fractionally distilled in an efficient fractionating column.

After removal of lower boiling materials amounting to 8.8 g., there is obtained 7.2 g. of material boiling at 145° to 153° C. at 1 mm. mercury pressure. This fraction readily absorbs bromine from a carbon tetrachloride solution and consists essentially of diethyl 4,8-dodecadiene-1,12-dioate. A portion of this ester saponified in aqueous ethanol solution of sodium hydroxide yields 4,8-dodecadiene-1,12-dioic acid, which readily absorbs bromine and when crystallized from ethyl acetate has a melting point of 163–164° C.

A portion of the unsaturated ester of Example I is hydrogenated in methanol solution over a palladium-on-charcoal catalyst at a hydrogen pressure of 40 pounds. The hydrogenated product is saponified in methanolic potassium hydroxide and there is obtained, after acidification of the potassium salt, white crystals of 1,12-dodecanedioic acid melting at 126–127° C. A mixed melting point of this acid with an authentic sample of 1,12-dodecanedioic acid is not depressed.

Example II

A solution of 300 ml. of methanol, 20 g. of potassium ethyl malonate, 60 g. of ethyl hydrogen malonate, and 150 ml. of isoprene is electrolyzed in a cell fitted with two platinum electrodes, each of 55 square centimeters area, with a current of 7 amperes until the solution becomes alkaline as indicated by a test with pH paper. At this point, 1.4 equivalents of electricity has been passed through the solution. The temperature during electrolysis is maintained at 10° to 20° C. The reaction product is worked up in the same manner as described in Example I.

After removal of 20.8 g. of lower boiling material, there is isolated 15.7 g. of material boiling at 182–185° C. at 5 mm. mercury pressure. Absorption of bromine indicates that this product is highly unsaturated. Saponification of the product with a base gives an acidic product indicated to be a mixture of isomers of long-chain unsaturated dicarboxylic acids.

Example III

A solution of 350 ml. of methanol, 10 g. of potassium ethyl oxalate, 40 g. of ethyl hydrogen oxalate, and 150 ml. of butadiene is electrolyzed in a cell having electrodes of platinum sheets, each 55 square centimeters in area, at a temperature of −15° C. An average current of 3.0 amperes is passed through the solution until the solution shows an alkaline reaction to pH paper, at which point 0.6 equivalent of current has been passed through the solution. The reaction mixture is worked up by the method used in the preceding examples.

After removal of lower boiling material amounting to 6 g. there are isolated 6 g. of material boiling from 137° to 145° C. at 4 mm. mercury pressure and 7.4 g. of material boiling at 148-151° C. at 4 mm. mercury pressure. The lower boiling fraction is indicated to be the diethyl esters of isomeric decadienedioic acids. The higher boiling fraction is essentially all diethyl 3,7-decadiene-1,10-dioate. A 6-g. portion of this higher boiling fraction is hydrogenated over palladium-on-charcoal catalyst and then saponified with an aqueous ethanol solution of sodium hydroxide. The acid which is obtained amounts to 4 g. and, when crystallized from ethyl acetate, gives crystals of sebacic acid melting at 132-134° C. The melting point is not depressed when this acid is mixed with an authentic sample of sebacic acid.

Example IV

A solution of 350 ml. of methanol, 6 g. of potassium methyl oxalate, 29.3 g. of methyl hydrogen oxalate, 90 ml. of butadiene, and 30 ml. of water is electrolyzed at a temperature of −8° C. in an electrolytic cell fitted with platinum electrodes at an average current density of 0.05 amp./cm.$^2$ until it is slightly alkaline as indicated by a test with pH paper. On working up the reaction mixture as in the preceding examples, there are obtained 4.5 g. of low boiling material, 4.9 g. of a fraction boiling from 120° to 135° C. at 2.7 mm. mercury pressure and 4.2 g. of a fraction boiling at 135-138° C. at 2.7 mm. mercury pressure.

The high boiling fraction is mainly dimethyl 3,7-decadiene-1,10-dioate, while the lower fraction is a mixture of dimethyl esters of lower boiling isomeric decadienedioic acids. Hydrogenation of the 135-138° fraction over palladium-on-charcoal catalyst followed by saponification of the resulting hydrogenated product yields sebacic acid melting, after recrystallization from ethyl acetate, at 130-133° C. This acid is identical with that obtained in Example III.

Example V

A solution of 300 ml. of methanol, 100 g. of butadiene, 12 g. of potassium ethyl succinate, and 31.8 g. of ethyl hydrogen succinate is electrolyzed in a cell fitted with platinum electrodes at a temperature of −10° C. and at a current density of 0.06 amp./cm.$^2$. The electrolysis is continued until 0.6 equivalent of current has been passed through the solution. The reaction mixture is worked up by the method described in Example I.

After removing 12.1 g. of low boiling material, there are isolated 2.1 g. of material boiling from 133° to 149° C. at 0.3 mm. mercury pressure and 1.6 g. of material boiling at 150-153° C. at 0.3 mm. mercury pressure. This last fraction is substantially pure diethyl 5,9-tetradecadiene-1,14-dioate. The intermediate fraction is a mixture of the diethyl esters of lower boiling isomeric tetradecadiendioic acids. Hydrogenation and saponification of the diethyl 5,9-tetradecadiene-1,14-dioate yields 1.1 g. of tetradecane-1,14-dioic acid melting at 124-125° C. (M. P. reported in literature is 126.5° C.).

Analysis calcd. for $C_{14}H_{26}O_4$: N. E., 129. Found: N. E. 129.

Example VI

A solution of 350 ml. of methanol, 100 g. of butadiene, 50 g. of ethyl hydrogen adipate, and 4 g. of potassium hydroxide is electrolyzed between platinum electrodes in an electrolytic cell maintained at −5° C. Because of the very low conductance of this solution, a current density of only 0.02 amp./cm.$^2$ is obtainable. The electrolysis is continued until about 0.5 equivalent of current is passed through the solution. The reaction mixture is worked up in the manner of the preceding examples.

After separation of lower boiling fractions by distillation, there is obtained 4.4 g. of material boiling at 200-213° C. at 2 mm. mercury pressure. This fraction, which is substantially all diethyl 7,11-octadecadiene-1,18-dioate, is hydrogenated over palladium-on-charcoal catalyst. On evaporation of the methanol from the hydrogenation solution, there is obtained diethyl octadecane-1,18-dioate melting, after crystallization from petroleum ether, at 42-43° C. The melting point of this ester reported in the literature is 43° C. A portion of the saturated ester is saponified in aqueous ethanol solution of sodium hydroxide and there are obtained white crystals of octadecane-1,18-dioic acid melting at 123-124° C. (M. P. of this acid recorded in the literature is 124° C.).

Analysis calcd. for $C_{18}H_{34}O_4$: N. E., 157. Found: N. E., 157.

Example VII

A solution of 350 ml. of methanol, 29.1 g. of ethyl hydrogen malonate, 12.5 g. of potassium ethyl malonate, and 150 ml. of butadiene is electrolyzed in a cell having an anode of carbon rods of 36 sq. centimeters total area and a platinum cathode. Electrolysis is conducted at −10° C. at a current density of 0.05 amp./cm.$^2$ until the solution becomes slightly alkaline. At the end of this time, 0.57 equivalent of electricity has been passed through the solution.

The fractions which are isolated from this reaction mixture by the method of the preceding examples correspond closely to those obtained by electrolysis of a similar electrolyte solution at a platinum anode. On fractional distillation there are obtained 6.8 g. of low boiling materials, 5.1 g. of a fraction boiling from 125° to 150° C. at 5 mm. mercury pressure consisting of a mixture of the diethyl esters of isomeric 12-carbon dienoic acids, and a fraction boiling at 152-165° C. at 5 mm. mercury pressure (7.0 g.) which is principally diethyl 4,8-dodecadiene-1,12-dioate. A portion of this last acid is hydrogenated and then saponified as in previous examples. The resulting product is 1,12-dodecanedioic acid melting at 124-127° C. and is identical with the acid obtained from the product of Example I.

Example VIII

A solution of 300 ml. of methanol, 12.5 g. of potassium ethyl malonate, 29 g. of ethyl hydrogen malonate, and 100 ml. of isoprene is electrolyzed at a temperature of −10° C. in a stainless steel beaker as the reaction cell. The beaker serves as the cathode and a platinum anode is used. After 0.28 equivalent of electric current has been passed, the solution shows an alkaline reaction.

The reaction mixture is then worked up as in the preceding examples and products are obtained which are similar to those obtained in Example II in a cell employing all platinum electrodes. After removal of 5.7 g. of low boiling materials by distillation, there are obtained 3.2 g. of a fraction boiling from 140° to 160° C. at 2 mm. mercury pressure which is a mixture of the diethyl esters of isomeric tetradecadienedioic acids, and 5.4 g. of a product boiling at 160–164° C. at 2 mm. mercury pressure comprising diethyl esters of higher boiling isomers of tetradecadienedioic acids.

The process of this invention has been illustrated in the examples with certain specific reactants, i. e., hydrocarbon monoesters of hydrocarbon dicarboxylic acids, particularly the monoalkylesters of saturated aliphatic hydrocarbon dicarboxylic acids; however, this invention is generic to the electrolysis of any acid-ester of any dicarboxylic acid and salt of such acid-ester in the presence of any conjugated diene. The acid-ester employed should be capable of forming a salt having sufficient solubility in the reaction medium to give to the solution a conductivity great enough to permit the passage of electric current at a density sufficient to give a practical rate of electrolysis. Specific examples of acid-esters of dicarboxylic acids which can be employed in addition to those mentioned in the examples include n-butyl hydrogen succinate, n-octadecyl hydrogen oxalate, cyclohexyl hydrogen adipate, phenyl hydrogen malonate, isopropyl hydrogen suberate, methyl hydrogen sebacate, propyl hydrogen malonate, and cyclohexyl hydrogen adipate.

The particular salt of the acid-ester of the dicarboxylic acid used in the process of this invention is not critical. Sodium, potassium, magnesium, calcium, barium, strontium, ammonium, zinc, nickel, and the like salts which are sufficiently soluble in the reaction system to provide a practical conductivity are operable. The alkali metal salts are especially satisfactory and are therefore preferred. It is not necessary to form the salt of the acid-ester of the dicarboxylic acid before adding it to the reaction mixture. It can be formed in situ by adding a small proportion of an alkali metal hydroxide or oxide to the solution of the acid-ester of the dicarboxylic acid.

Any conjugated diene which is free of substituents that are oxidizable under the operating conditions can be used in the process of this invention. In addition to the conjugated diene hydrocarbons, butadiene and isoprene, mentioned in the examples, other conjugated dienes which can be used include alkyl and aryl substituted dienes, e. g., 2,3-dimethyl-1,3-butadiene, 2-phenyl-1,3-butadiene, 2,3-diphenyl-1,3-butadiene; halogenated dienes, e. g., 2-fluoro-1,3-butadiene, 2-chloro-1,3-butadiene, 2,3-dichloro-1,3-butadiene; cyano butadienes, e. g., 2-cyano-1,3-butadiene and 2,3-dicyano-1,3-butadiene; conjugated dienes having ether groups, e. g., 2-methoxy-1,3-butadiene and 2-phenoxy-1,3-butadiene; conjugated dienes having ester substitutents, e. g., 1-acetoxy-2,3-butadiene and 2,3-diacetoxy-1,3-butadiene; and cyclic hydrocarbon dienes, e. g., cyclopentadiene and 1,3-cyclohexadiene. Those conjugated dienes which polymerize very readily, e. g., the halogenated hydrocarbon dienes, such as chloroprene, are operable in the process of this invention, although they are less desirable since they tend to form polymerization products which are difficult to separate from the desired esters of unsaturated long-chain dicarboxylic acids.

Any organic liquid which is inert to the reactants and is a solvent for the acid-ester of the dicarboxylic acid and its salt and also for the diene can be used as a reaction medium. Examples of suitable inert organic solvents include, besides the methanol of the examples, ethanol, ethylene glycol, diethylene glycol, and the like. Small amounts of water can be present in the reaction medium; however, the amount of water should not be so great as to reduce substantially the solubility of the diene in the reaction system.

Platinum is the preferred material of construction for the electrodes of the electrolytic cells used in the process of this invention. However, other materials can be used. Materials suitable for the anodes must be resistant to oxidation. Thus, carbon, graphite, and gold anodes in addition to platinum are useful. A larger variety of materials is suitable for use as cathodes, since, in this case, it is only necessary that the material not be corroded extensively by the reaction mixture. In addition to platinum, the cathode can be constructed of stainless steel, carbon, lead, nickel, and the like. Stationary electrodes give satisfactory results in the process of this invention. However, improved yields of the esters of dibasic acids are obtained when the anode is rapidly rotated during electrolysis.

The process of this invention has marked advantages over the heretofore known methods of making esters of long-chain dicarboxylic acids. It is capable of producing such esters directly without first forming the dicarboxylic acid and then subjecting it to an esterification reaction. By the use of this process it is also possible to prepare long-chain dicarboxylic acid esters having at least eight more carbon atoms between the carboxyl groups of the ester than is possible by the hitherto known electrolytic oxidation methods, and it also permits the introduction of two nonconjugated ethylenic double bonds.

As many apparently widely different embodiments of this invention can be made without departing from the spirit and scope thereof, it is to be understood that this invention is not limited to the specific embodiments thereof except as defined in the appended claims.

We claim:

1. Process for preparing a diester of an unsaturated alpha,omega-dicarboxylic acid which comprises subjecting a monoester salt of a saturated alpha,omega-dicarboxylic acid to electrolysis in an inert organic solvent containing a conjugated diene, said electrolysis being under conditions suitable for producing said diester and until the monoester salt is substantially completely converted, and recovering said diester of a carbon content equal to two less than twice the sum of the carbon contents of the monoester salt and diene compound.

2. Process for preparing a diester of an unsaturated alpha,omega-dicarboxylic acid which comprises subjecting a monoester of a saturated alpha,omega-dicarboxylic acid and a monoester salt of said saturated alpha,omega-dicarboxylic acid to electrolysis in an inert organic solvent containing a conjugated diene, said electrolysis being under conditions suitable for producing said diester and until the monoester is substantially completely converted, and recovering said diester of a carbon content equal to two less than twice the sum of the carbon contents of the monoester and diene compound.

3. Process for preparing a diester of an unsaturated alpha,omega-dicarboxylic acid which comprises subjecting a monoester of a saturated alpha,omega-dicarboxylic acid to electrolysis in an inert organic solvent containing an alkali metal hydroxide and a conjugated diene, said electrolysis being under conditions suitable for producing said diester and until the monoester is substantially completely converted, and recovering said diester of a carbon content equal to two less than twice the sum of the carbon contents of the monoester and diene compound.

4. Process for preparing a diester of an unsaturated alpha,omega-dicarboxylic acid as set forth in claim 1 wherein said conjugated diene is butadiene.

5. Process for preparing a diester of an unsaturated alpha,omega-dicarboxylic acid as set forth in claim 1 wherein said conjugated diene is isoprene.

6. Process for preparing a diester of an unsaturated alpha,omega-dicarboxylic acid as set forth in claim 1 wherein said monoester salt of a saturated alpha,omega-dicarboxylic acid is potassium ethyl oxalate.

7. Process for preparing a diester of an unsaturated alpha,omega-dicarboxylic acid as set forth in claim 1 wherein said monoester salt of a saturated alpha,omega-dicarboxylic acid is potassium ethyl malonate.

8. Process for preparing a diester of an unsaturated alpha,omega-dicarboxylic acid as set forth in claim 1 wherein said monoester salt of a saturated alpha,omega-dicarboxylic acid is potassium ethyl adipate.

9. Process for preparing a diester of an unsaturated alpha,omega-dicarboxylic acid which comprises subjecting potassium ethyl malonate to electrolysis in an inert organic solvent containing butadiene, said electrolysis being under conditions suitable for producing said diester and until the potassium ethyl malonate is substantially completely converted, and recovering said diester of a carbon content equal to two less than twice the sum of the carbon contents of potassium ethyl malonate and butadiene.

10. Process for preparing a diester of an unsaturated alpha,omega-dicarboxylic acid which comprises subjecting ethyl hydrogen malonate and potassium ethyl malonate to electrolysis in an inert organic solvent containing isoprene, said electrolysis being under conditions suitable for producing said diester and until the ethyl hydrogen malonate is substantially completely converted, and recovering said diester of a carbon content equal to two less than twice the sum of the carbon contents of ethyl hydrogen malonate and isoprene.

11. Process for preparing a diester of an unsaturated alpha,omega-dicarboxylic acid which comprises subjecting ethyl hydrogen malonate and potassium ethyl malonate to electrolysis in an inert organic solvent containing butadiene, said electrolysis being under conditions suitable for producing said diester and until the ethyl hydrogen malonate is substantially completely converted, and recovering said diester of a carbon content equal to two less than twice the sum of the carbon contents of ethyl hydrogen malonate and isoprene.

12. Process for preparing a diester of an unsaturated alpha,omega-dicarboxylic acid which comprises subjecting ethyl hydrogen oxalate and potassium ethyl oxalate to electrolysis in an inert organic solvent containing butadiene, said electrolysis being under conditions suitable for producing said diester and until the ethyl hydrogen oxalate is substantially completely converted, and recovering said diester of a carbon content equal to two less than twice the sum of the carbon contents of ethyl hydrogen oxalate and butadiene.

13. Process for preparing a diester of an unsaturated alpha,omega-dicarboxylic acid which comprises subjecting ethyl hydrogen adipate to electrolysis in an inert organic solvent containing potassium hydroxide and butadiene, said electrolysis being under conditions suitable for producing said diester and until the ethyl hydrogen adipate is substantially completely converted, and recovering said diester of a carbon content equal to two less than twice the sum of the carbon contents of ethyl hydrogen adipate and butadiene.

References Cited in the file of this patent

Hickling et al., Journal Chemical Society (1938), pp. 1039–1046; (1939) pp. 1109–1114.

Glasstone et al., Electrolytic Oxidation and Reduction (1936), pp. 308–309.